United States Patent [19]

Leblond et al.

[11] Patent Number: 5,406,839

[45] Date of Patent: Apr. 18, 1995

[54] INCIDENCE PROBE WITH MULTIPLE PRESSURE INLETS

[75] Inventors: Henri Leblond, Versailles; Joël Choisnet, La Frette Sur Seine, both of France

[73] Assignee: Sextant Avionique, Meudon-LaForet Cedex, France

[21] Appl. No.: 95,025

[22] Filed: Jul. 22, 1993

[30] Foreign Application Priority Data

Aug. 4, 1992 [FR] France .................. 92 09655

[51] Int. Cl.⁶ .............................................. G01C 21/20
[52] U.S. Cl. ................................. 73/180; 73/170.02; 73/202
[58] Field of Search ...................... 73/202, 202.5, 195, 73/196, 180, 170.02, 170.05, 147

[56] References Cited

U.S. PATENT DOCUMENTS

| | | | |
|---|---|---|---|
| 2,352,955 | 7/1944 | Johnson | 73/180 |
| 3,559,482 | 2/1971 | Baker et al. | 73/202.5 |
| 4,576,043 | 3/1986 | Nguyen | 73/195 |

FOREIGN PATENT DOCUMENTS

| | | |
|---|---|---|
| 0176405 | 4/1986 | European Pat. Off. . |
| 1055265 | 6/1957 | Germany . |

*Primary Examiner*—Richard E. Chilcot, Jr.
*Assistant Examiner*—Joseph L. Felber
*Attorney, Agent, or Firm*—Lowe, Price, LeBlanc & Becker

[57] ABSTRACT

The present invention relates to an incidence probe, in particular for an aircraft, comprising at least two pressure inlets. To this end, it comprises a least one flowmeter (1) and a pneumatic restriction (4) arranged in series between two pressure inlets.

5 Claims, 2 Drawing Sheets

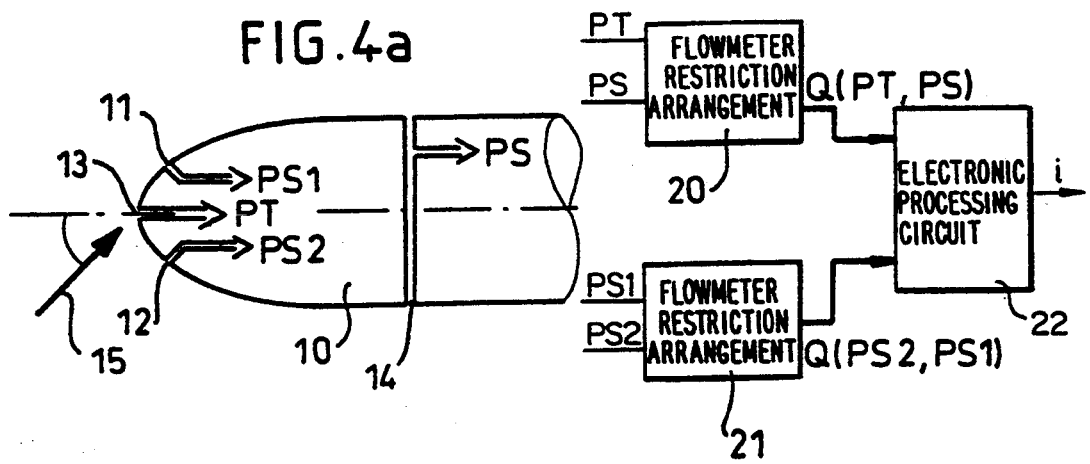
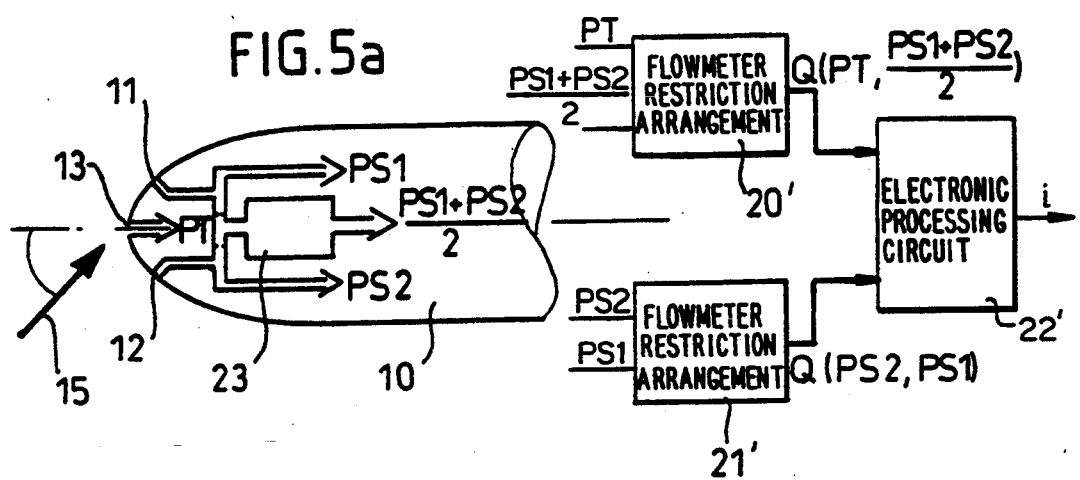
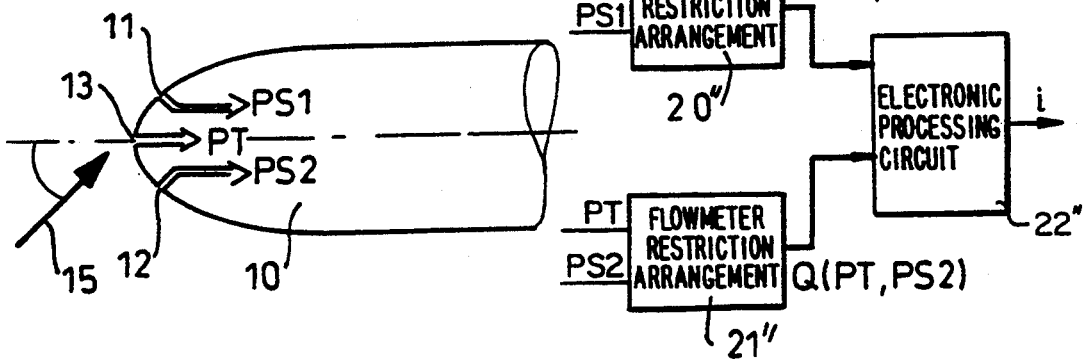

INCIDENCE PROBE WITH MULTIPLE PRESSURE INLETS

BACKGROUND

1. Field of Invention

The present invention relates to an incidence probe, in particular for an aircraft, and more particularly a probe of this type comprising at least two pressure inlets.

2. Related Art

In known devices, these probes are mainly constituted by a rod mounted on the fuselage or on the leading edge of the wings of the aircraft and comprising different pressure inlets, pressure sensors connected to these pressure inlets and processing electronics.

In all cases, the angle of incidence i is equal, ignoring the a multiplying coefficient k, to the ratio of two pressures dp and DP calculated by the processing electronics:

$$i = k(dp/DP)$$

in which dp is an incidence or disalignment pressure and DP is a dynamic pressure.

The pressures dp and DP are measured by means of relative sensors or pressure differential sensors.

In devices of this type, in order to obtain constant accuracy in the measurement of the angle of incidence over a wide range of aerodynamic speeds, the accuracy of the pressure sensors used must be increased the lower the pressures to be measured.

In fact, let us consider a probe in which, the coefficient k is equal to 40, that is to say that for an incidence of 40 degrees, the incidence pressure dp is equal to the dynamic pressure DP.

Let us assume that this probe is to be used in a range of aerodynamic speeds varying from 50 to 250 m/sec and in a range of angles of incidence extending from −40 degrees to +40 degrees.

One can show that the accuracy necessary on the sensors is then of the order of $4.10^{-4}$ of the measuring range.

This leads to sensors which are precise and troublesome, only adequate at low speeds but with too high a performance at high speeds, thus inefficient or ineffective.

The present invention intends to obviate these drawbacks.

SUMMARY OF INVENTION

To this end, the invention relates to an incidence probe, in particular for an aircraft, comprising at least two pressure inlets, characterised by the fact that it comprises at least one flow meter and one pneumatic restriction arranged in series between the two pressure inlets.

It will be noted that the existence of microflow-sensors integrated on silicon and which are not very troublesome makes the device according to the invention particularly advantageous.

In the case where these sensors would not have sufficient accuracy, it is nevertheless still possible to use flow sensors.

For example one can connect in series between the two pressure inlets, a pneumatic restriction and at least two flowmeters adapted to different ranges of flow.

It is also possible to connect in parallel between the two pressure inlets at least two restrictions each associated in series with a flowmeter, the flowmeters being adapted to different ranges of flow.

In a particular embodiment, the probe according to the invention comprises at least three pressure inlets and, between two of the pressure inlets, at least one restriction and at least one flowmeter arranged for measuring a flow corresponding to an incidence pressure dp, and, between two pressure inlets, at least one restriction and at least one flowmeter arranged for measuring a flow corresponding to a dynamic pressure DP, and calculation means for determining the angle of incidence of the probe from the flows measured.

Advantageously, in all embodiments the following conditions are met

- the dimensioning of the restriction is such that the pressure drop at the terminals of the flowmeter is negligible, that is to say that the pressure drop between the two pressure inlets takes place in quasi-totality on passing the restriction,
- the flow at the level of the restriction is such that, calling its speed v, and P1 and P2 the pressures at the level of the pressure inlets and k a multiplying constant, we have:

$$P2 - P1 = k v^2$$

and,

- the flow is sufficiently low so as not to significantly alter the pressures at the level of the two pressure inlets.

In fact one can show that the angle of incidence i may then be written:

$$i = k(q/Q)^2$$

where q is the flow corresponding to the pressure dp and Q is the flow corresponding to the pressure DP and k is the multiplying constant. The flow is in units of mass per second, e.g. Kg/sec.

By adopting the above hypotheses, one can show that the accuracies necessary for the flow sensors are approximately $10^{-3}$ of their measuring range, or a gain by a factor of the order of 2.5.

The fact of using flow sensors in place of pressure sensors thus makes it possible to obtain the same accuracy of the incidence with sensors which do not perform as highly.

One shows that the gain obtained in the necessary accuracies is equal to $0.5\sqrt{P_{max}/P_{min}}$ in which $P_{max}$ is the dynamic pressure corresponding to the maximum aerodynamic speed and $P_{min}$ is the dynamic pressure corresponding to the minimum aerodynamic speed.

It is thus obvious that the gain obtained is even more significant the greater the ratio between the minimum and maximum speeds of utilisation of the probe.

Particular embodiments of the invention will now be described as non-limiting examples, with reference to the accompanying drawings, in which:

BRIEF DESCRIPTION OF THE INVENTION

FIG. 1 illustrates the use of a flowmeter in a probe according to the invention, FIGS. 2 and 3 show variations of FIG. 1, and FIGS. 4a and 4b, 5a and 5b, 6a and 6b respectively illustrate three incidence probes according to the invention.

DESCRIPTION OF PREFERRED EMBODIMENTS

Figure 1:
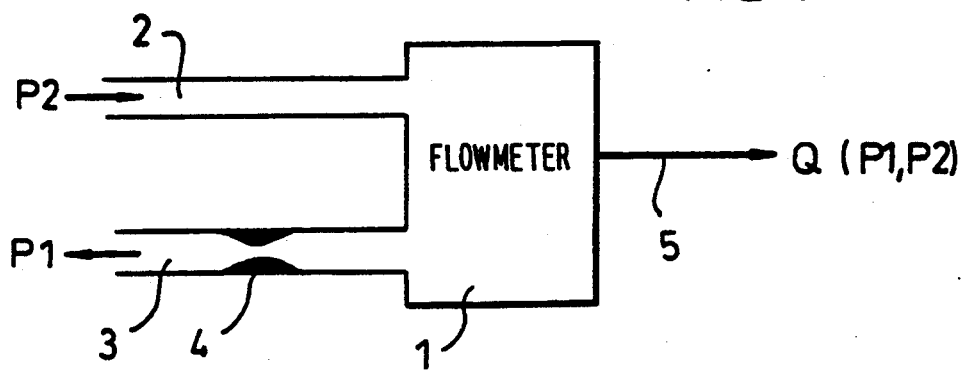

FIG. 1 shows a flowmeter 1 connected by two pipes 2 and 3 to pressure inlets which are not shown in this drawing. It should be noted that depending on the incidence of the probe, which will change with the change in orientation of the probe during, for example, take-off and landing of an aircraft, the pressure at each of the pressure inlets will change. Typically, one or the other of the pressure inlets will, at any given time, be exposed to a higher pressure than the other inlet. From a system standpoint, the inlet experiencing the higher pressure will act as a gas or fluid flow inlet while the pressure inlet subjected to the lower pressure will serve as the gas or fluid flow outlet. For example, in FIGS. 1-3, the flow is shown from pipe 2 to pipe 3. This necessarily means that the pressure inlet connected to pipe 2 is experiencing a higher pressure than the pressure inlet connected to pipe 3. When the pressures are the same, there is necessarily no flow through the pipes. The pipe 3 comprises a restriction 4. The electrical output 5, Q(P1, P2), from the flowmeter 1 is applied to the input of an electronic processing circuit, which is also not shown in this Figure.

Figure 2:
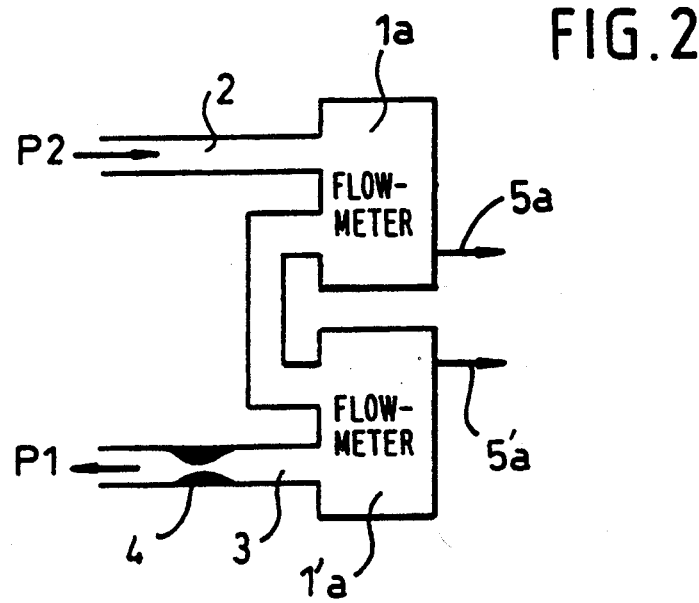
Figure 3:
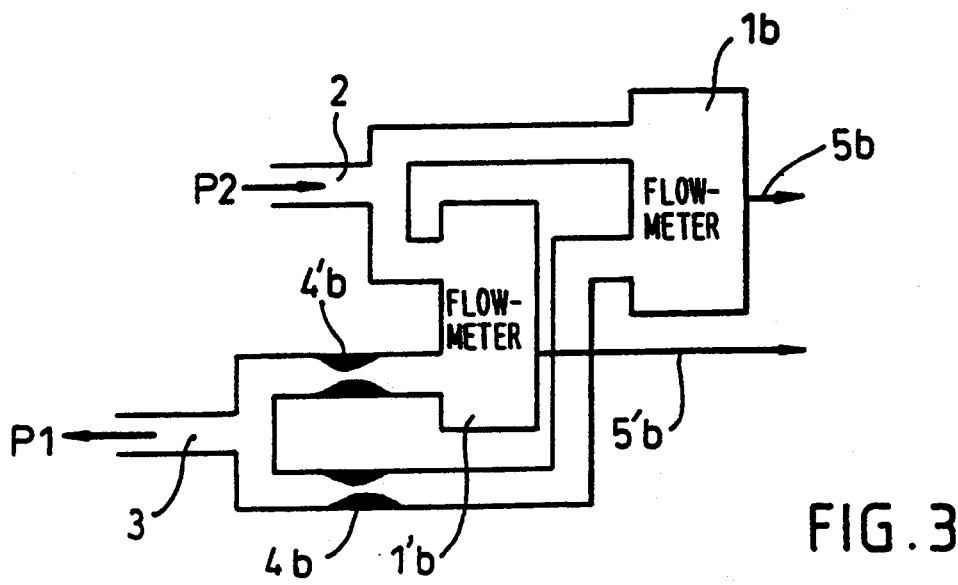

FIGS. 2 and 3 show embodiments making it possible to overcome insufficient accuracy of the flowmeter 1 throughout the entire necessary measuring range.

In the case of FIG. 2, the flowmeter 1 is simply replaced by two flowmeters 1a and 1'a arranged in series, the flowmeter 1a being for example adapted to the measurement of low flows and the flowmeter 1'a adapted to the measurement of high flows.

The electrical outputs 5a and 5'a of the flowmeters 1a and 1'a respectively are applied to the input of the electronic processing circuit, which uses either information depending on whether the flow is low or high.

In the case of FIG. 3, the flowmeter 1 and the restriction 4 are replaced between the pressure inlets P1 and P2, by two measuring arrangements arranged in parallel, namely a first arrangement constituted by a flowmeter 1b in series with a restriction 4b and a second arrangement constituted by a flowmeter 1'b in series with a restriction 4'b.

The flowmeter 1b is adapted for measuring low flows and the flowmeter 1'b is adapted for measuring high flows.

The electrical outputs 5b and 5'b of the flowmeters 1b and 1'b respectively are applied to the input of the electronic processing circuit, which uses either information according to whether the flow is low or high.

Naturally, the restrictions 4 and their associated flowmeter 1 preferably conforms to the above-mentioned conditions.

FIGS. 4a, 5a and 6a show the rods 10 of probes according to the invention.

All the rods comprise two lateral incidence pressure inlets 11 and 12 arranged symmetrically with respect to the axis of the rod in order to make available respectively pressures PS1 and PS2 and an axial pressure inlet 13 in order to make available the total pressure PT. The rod 10 of FIG. 4a also comprises a static pressure PS inlet 14.

In the three cases, the arrow 15 represents the direction of the wind which forms an angle i with the axis of the rod.

Referring now to FIGS. 4b, 5b and 6b, it can be seen that the three probes illustrated comprise two flowmeter/restriction arrangements 20, 20', 20'' respectively and 21, 21', 21'' respectively, each according to one of the embodiments of FIGS. 1 to 3 and an electronic processing circuit 22, 22', 22'' to the input of which the electrical outputs of the flowmeter restriction arrangements 20 and 21 are applied.

In the embodiment of FIGS. 4a and 4b, the pressures PT and PS are applied to the terminals of the arrangement 20 and the pressures PS1 and PS2 are applied to the terminals of the arrangement 21.

The electrical output Q(PT,PS) of the arrangement 20 is representative of the rate of flow passing through this arrangement and the electrical output Q(PS2,PS1) of the arrangement 21 is representative of the rate of flow passing through this arrangement.

The processing unit 22 is thus arranged in order to calculate the angle i using multiplying constant k by the following formula $$i = k \left( \frac{Q(PS2,PS1)}{Q(PT,PS)} \right)^2$$

In the embodiment of FIGS. 5a and 5b, a buffer cavity 23 makes it possible to produce pneumatically the average of the pressures PS1 and PS2 and thus constitutes a pressure inlet at the pressure (PS1+PS2)/2.

The pressures PT and (PS1+PS2)/2 are then applied to the terminals of the arrangement 20' and the pressures PS2 and PS1 are applied to the terminals of the arrangement 21'.

The output Q(PT,(PS1+PS2)/2) of the arrangement 20' is representative of the rate of flow passing through this arrangement.

Similarly, the electrical output Q(PS2,PS1) of the arrangement 21' is representative of the rate of flow passing through this arrangement.

The processing electronics 22' thus determine the angle of incidence i using multiplying constant k by the following formula:

$$i = k \left( \frac{Q(PS2,PS1)}{Q(PT,(PS1+PS2)/2)} \right)^2$$

In the embodiment of FIGS. 6a and 6b, the pressures PT and PS1 are applied to the terminals of the arrangement 20'' and the pressures PT and PS2 are applied to the terminals of the arrangement 21''.

The electrical output Q(PT,PS1) of the arrangement 20'' is representative of the rate of flow passing through this arrangement and the electrical output Q(PT,PS2) of the arrangement 21'' is representative of the rate of flow passing through this latter arrangement.

The processing electronics 22'' thus calculate the angle of incidence i using multiplying constant k by the following formula:

$$i = 2k \left( \frac{Q(PT,PS1)^2 - Q(PT,PS2)^2}{Q(PT,PS1)^2 + Q(PT,PS2)^2} \right)$$

The devices of FIGS. 1 to 3 may also be used as a take-off indicator.

In this case, the axis of the probe is inclined with respect to the axis of the aircraft by an angle equal to the take-off incidence. That is, during take-off the longitudinal axis of the aircraft is at an angle to the ground referred to as the take-off incidence. The axis of the probe is angled to the longitudinal axis of the aircraft, for example towards the top of the aircraft or the ground, at an angle equal to the take-off incidence angle.

The pressure inlets P1 and P2 are disposed like the incidence pressure inlets PS1 and PS2 of FIGS. 4a, 5a and 6a. Consequently the flow reverses on passing through the take-off incidence. This is because at take-off one of the pressure inlets will experience a higher pressure causing the flow to be in one direction, i.e. from the pipe which is attached to the higher pressure inlet to the pipe which is attached to the lower pressure inlet. Due to the angling of the probe, during the leveling off of the aircraft after take-off, the pressure inlet which experienced lower pressure at take-off will become subject to a higher pressure. Correspondingly, the pressure inlet which experienced higher pressure at take-off will experience lower pressure. Thus during the coarse of the transition, the flow of the air through the system will reverse.

In this configuration, one thus uses only the accuracy characteristics at the zero point of the flowmeter, which is particularly favorable, integrated flowmeters naturally having their greatest accuracy in the vicinity of zero.

The devices of FIGS. 4a, 4b to 6a, 6b may furthermore be used on weather vanes able to move about an axis, which align in the wind's eye.

These weather vanes are constituted by a vane comprising static and total pressure inlets and a set of incidence pressure inlets making it possible to detect and measure imperfections of alignment of the vane into the wind. It is thus possible to use the probes of these figures, either for measuring the alignment error of the vane and thus for calculating a correction of the incidence given by the vane, or detecting the alignment error in order to govern a control arrangement which restores the vane to its exact position.

In this application, as in the take-off indicators, only the characteristics of accuracy of the flowmeter around the zero point are useful, the weather vane naturally aligning with a direction very close to that of the wind.

We claim:

1. An incidence probe, in particular for an aircraft, for measuring an angle of incidence, comprising:
   at least two pressure inlets; at least and pneumatic restriction between two of said inlets;
   at least one flowmeter in series with said at least one restriction for measuring a flow between one of said inlets and another of said inlets; and
   processing means for deducing the angle of incidence from said measured flow.

2. An incidence probe according to claim 1, further comprising in series between two of said pressure inlets, a pneumatic restriction and at least two flowmeters adapted to different ranges of a flow related physical quantity.

3. An incidence probe according to claim 1, further comprising, in parallel between two of said pressure inlets, at least two restrictions each associated in series with a respective one of two flowmeters, each of the respective flowmeters being adapted to different ranges of a flow related physical quantity.

4. An incidence probe according to claim 1, wherein:
   said at least two pressure inlets including a first, a second, and a third pressure inlet, and
   between said first and said second pressure inlets said, at least one restriction and at least one flowmeter are arranged for measuring a flow corresponding to an incidence pressure, and
   between one of said first and said second pressure inlets pressure inlet, at least one of said restrictions and at least one of said flowmeters are arranged for measuring a flow corresponding to a dynamic pressure, and
   the processing means determines the angle of incidence of the probe from the flows measured.

5. An incidence probe according to claim 4, wherein:
   the restrictions are such that pressure drops at an inlet and an outlet of each of the flowmeters are negligible; and
   the flow at each restriction is such that:
   (i) $P2-P1=k.v^2$
   in which k is a constant, v is the speed of flow at the restriction and P1 and P2 are the pressures at the corresponding pressure inlet and outlet,
   (ii) the flow is sufficiently low so as not to alter said pressures P1 and P2, and
   (iii) the processing means calculates the angle of incidence, by the square of the ratio of the flow corresponding to the incidence pressure to the flow corresponding to the dynamic pressure.

* * * * *